No. 874,472.
PATENTED DEC. 24, 1907.
C. F. WILSEY.
FARM GATE.
APPLICATION FILED MAY 15, 1907.
2 SHEETS—SHEET 1.
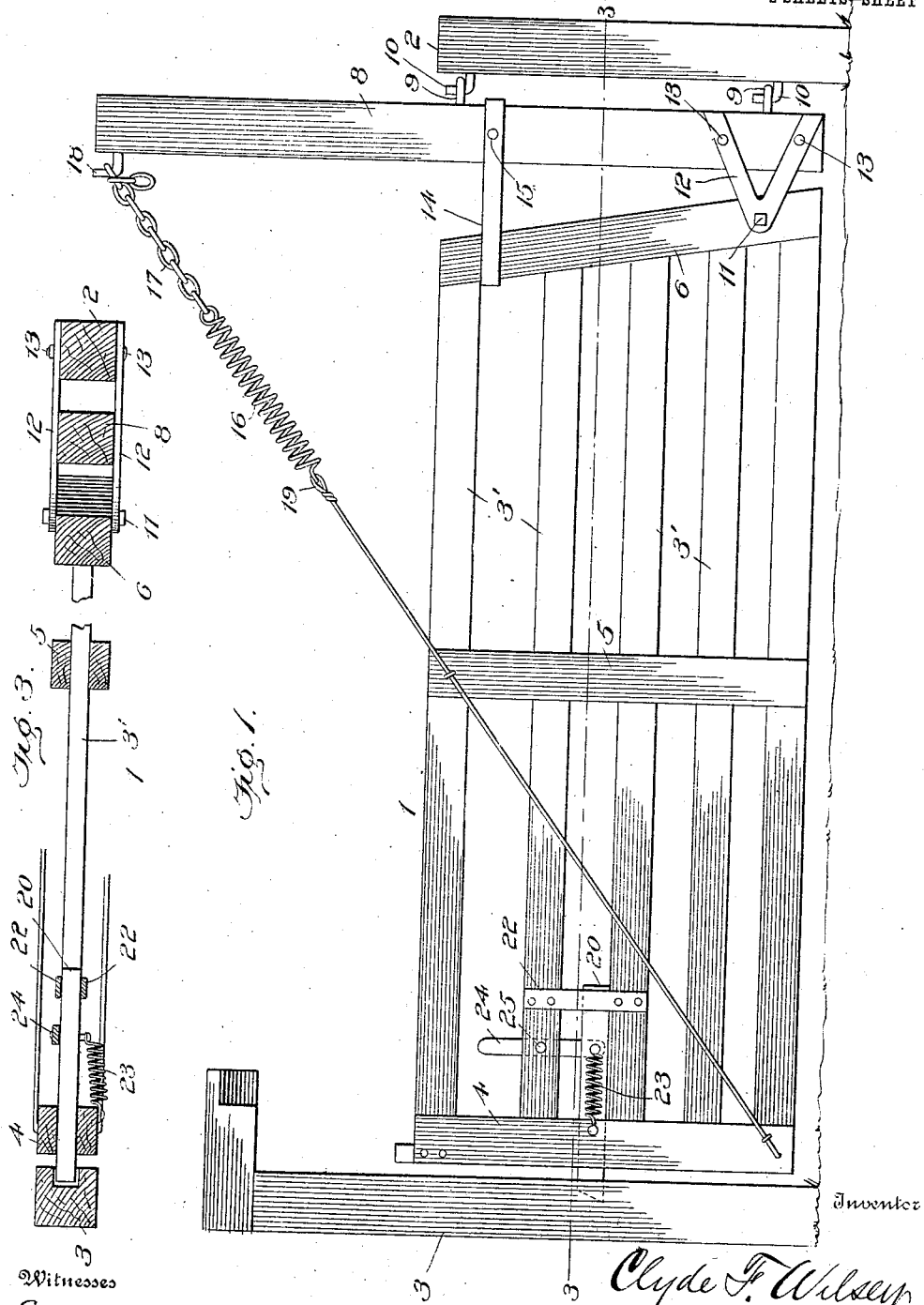

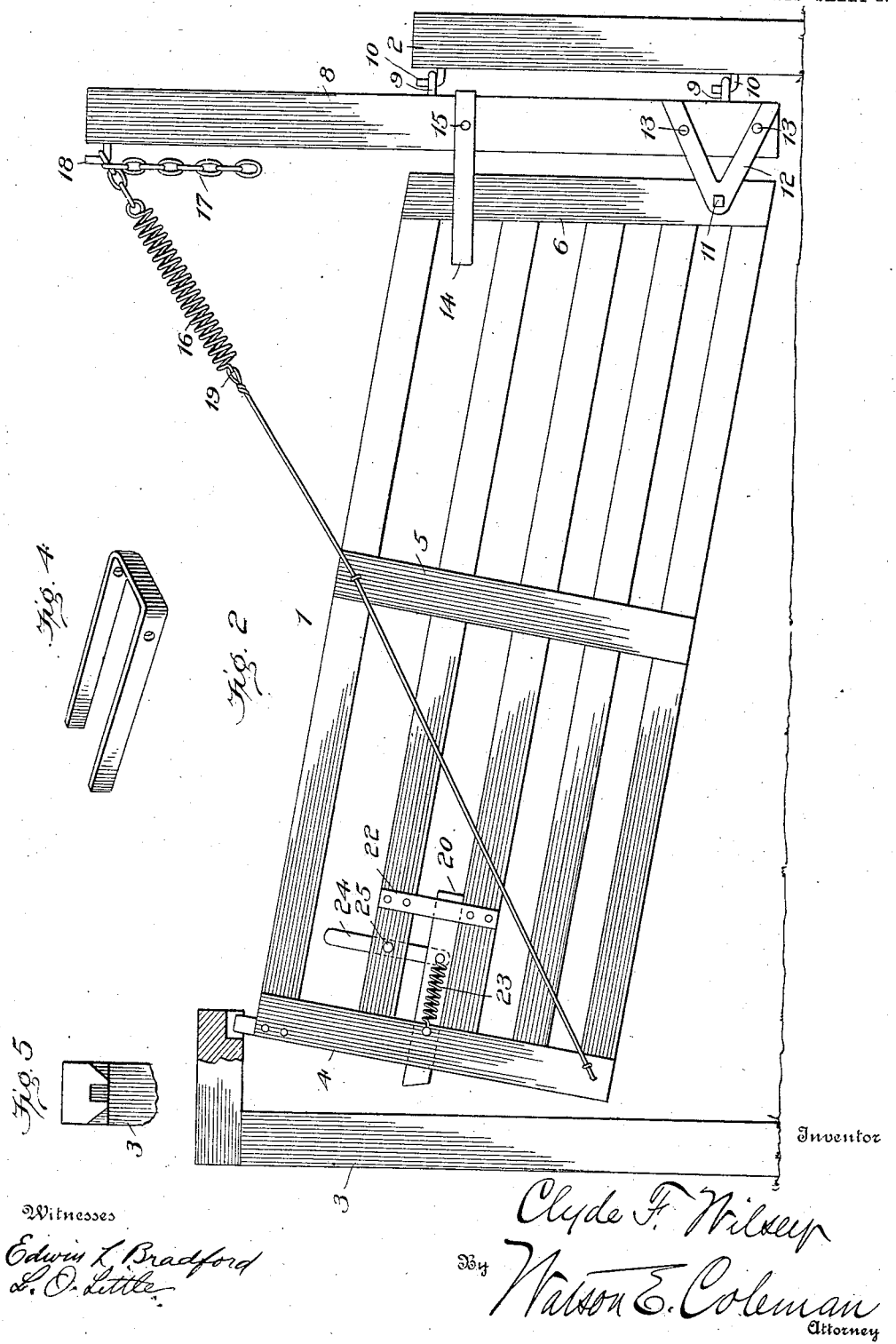

UNITED STATES PATENT OFFICE.

CLYDE F. WILSEY, OF ASHLEY, INDIANA.

FARM-GATE.

No. 874,472.  Specification of Letters Patent.  Patented Dec. 24, 1907.

Application filed May 15, 1907. Serial No. 373,785.

*To all whom it may concern:*

Be it known that I, CLYDE F. WILSEY, a citizen of the United States, residing at Ashley, in the county of Steuben and State of Indiana, have invented certain new and useful Improvements in Farm-Gates, of which the following is a specification, reference being had therein to the accompanying drawing.

My invention relates to improvements in farm gates and consists of the novel construction and combination of parts hereinafter described and claimed.

The object of the invention is to provide a gate of the horizontal swinging type which is also adapted to swing vertically and to be yieldably supported so that when its latch is released it will be self-lifting and will be elevated a sufficient distance above the ground to clear the same as it swings horizontally to its open position.

Another object of the invention is to provide a gate of this character which may be tilted endwise so that one of its ends may be raised a sufficient distance above the ground to permit small animals or live stock to pass beneath the same while cattle and other large live stock will be prevented from passing through the gate opening.

The above and other objects are accomplished in the preferred embodiment of the invention, illustrated in the accompanying drawings, in which Figure 1 is a side elevation of my improved gate, showing the same in its closed and lowered position; Fig. 2 is a view showing it in its raised or tilted position; Fig. 3 is a horizontal sectional view; Fig. 4 is a detail view of the U-shaped guide for the upper portion of the gate; and Fig. 5 is a detail view of the top of the latch post.

In the drawings, 1 denotes the gate, 2 the hinge post and 3 the latch post. The body of the gate may be of any suitable form and construction but I preferably make it of a plurality of parallel longitudinal bars 3' connected by upright bars 4, 5, 6 arranged in pairs on opposite sides of the bars 3'. The bars 4 at the outer end of the gate and the bars 5 at its center are vertically disposed, while the bars 6 at its inner end are inclined so that the bottom of the gate is of greater length than its top. The body of the gate is thus formed with this angular or inclined inner end so that it may swing or tilt vertically upon an upright 8 which carries it. This upright is considerably higher than the gate and may be hingedly connected to the post 2 in any suitable manner, but as shown, it is provided with eyes 9 adapted to receive pintle hooks 10 arranged on the post 2. The body of the gate is pivoted at its lower end to the lower portion of the upright 8 by a removable pivot bolt or rod 11 which passes transversely through the end bars 6 and through the angular ends of two V-shaped brackets or hangers 12. The latter are arranged on opposite sides of the lower portion of the upright and the bars 6 and have their diverging arms secured to said upright by suitable fastenings 13.

The gate is guided in its vertical swinging movement by a U-shaped guide 14 which is passed around the upright 8 and has its closed end secured thereto by screws or other suitable fastenings. The parallel arms of the guide 14 extend horizontally or at right angles to the upright and receive between them the end bars 6 of the gate. In order to yieldably and adjustably support the outer end of the gate I provide a coil spring 16 and connect one of its ends to a chain 17 and its other end to a link 19. The chain 17 forms means for adjusting this connection and is adapted to have any of its links engage a hook 18 arranged upon the upper portion of the upright 8. The link 19 is formed by bending a piece of heavy wire or metal rod upon itself and twisting its closed end to form an eye to which the spring is attached. The ends of this wire or rod extend downwardly and outwardly to the lower and outer end of the gate and are secured upon the outer faces of the bars 4, 5 by staples or other suitable fastenings.

Upon the outer end of the gate is provided a latch which is preferably in the form of a bar 20 mounted for sliding movement between two of the bars 3' and the two upright bars 4. The outer end of the latch bar is beveled and adapted to enter a keeper recess formed in the inner face of the latch post 3. Its inner end is guided by upright strips 22 arranged upon the opposite sides of the bars 3' between which the same is disposed. It is projected outwardly by a coil spring 23 and it is retracted by a hand lever 24 pivoted intermediate its ends at 25 upon one of the bars 3' and loosely connected at its lower end to the latch bar, as clearly shown in the drawings.

Upon the upper and outer corner of the gate is an upwardly extending projection 26 adapted to be engaged with a keeper recess 27 formed in the under side of the outer end of an arm 28 projecting from the top of the latch post 3. This projection 26 is adapted to enter the recess 27 when the gate is tilted upwardly, as shown in Fig. 2 and adjusted in such position so as to permit small animals to pass under the gate.

From the foregoing description and upon reference to the drawings it will be seen that when the gate is in its closed position and secured by the latch 20 the spring 16 will be normally under tension so that when the latch is disengaged from the post 3, the gate will be tilted or lifted to an extent sufficient for its bottom to clear the ground and snow, ice, rocks or other objects that may be in the path of the gate as it swings horizontally upon its hinges. When the gate is swung to its closed position it is necessary to force its outer end downwardly before the latch can be engaged with the keeper recess in the latch post. Owing to the adjustable connection between the upper end of the chain and the top of the upright 8 it will be seen that the body of the gate may be supported so that its bottom will be held at any distance above the ground. This adjustable connection also permits the gate to be secured in its tilted position, shown in Fig. 2. The gate is raised to this position when it is desired to permit hogs, or other small live stock to pass under the gate, while cattle, horses and other large animals will be prevented from passing through the gate opening. When the gate is thus tilted it may be held closed as shown in Fig. 2 or in any suitable manner. As shown in said figure, a projection is provided upon the top of the outer end of the gate, to enter a keeper notch or recess in an arm projecting from the top of the latch post.

Having thus described my invention what I claim and desire to secure by Letters Patent is:

1. In a gate, a swinging upright, brackets upon the lower end of the same, guide arms projecting from said upright intermediate its ends, a gate body having an angular inner end pivoted at its lower and inner corner between said brackets and adapted to have its inner end swing between said arms, a hook upon the upper portion of said upright, a spring connected at one end to the outer portion of said gate and a chain connected to the other end of the spring and adapted to engage said hook to adjustably support the gate body, substantially as described.

2. In a gate, a hinge post, a latch post, an upright hinged to the hinge post, a gate body having an angular inner end pivoted at its lower corner to said upright, a guide for the upper portion of the inner end of the gate body, an inwardly extending arm upon the latch post provided with a keeper, means upon the upper and outer portion of the gate body to engage said keeper and means for adjustably supporting the body in a tilted position, substantially as described.

3. In a gate, a hinge post, a latch post, an upright hinged to the hinge post, a gate body having an angular inner end pivoted at its lower corner to said upright, a guide for the upper portion of the inner end of the gate body, an inwardly extending arm upon the latch post provided with a keeper recess, a projection upon the upper and outer portion of the gate body to engage said keeper recess and an adjustable connection between the outer portion of the gate body and the upper portion of said upright for holding the gate body in a tilted position, substantially as described.

In testimony whereof I hereunto affix my signature in presence of two witnesses.

CLYDE F. WILSEY.

Witnesses:
 OSCAR BUSS,
 EDWARD CLARK.